O. SCHULER & W. BUSCHMANN, Jr.
DEVICE FOR HANGING CIRCULAR SAWS.
APPLICATION FILED AUG. 30, 1918.
1,286,799.
Patented Dec. 3, 1918.
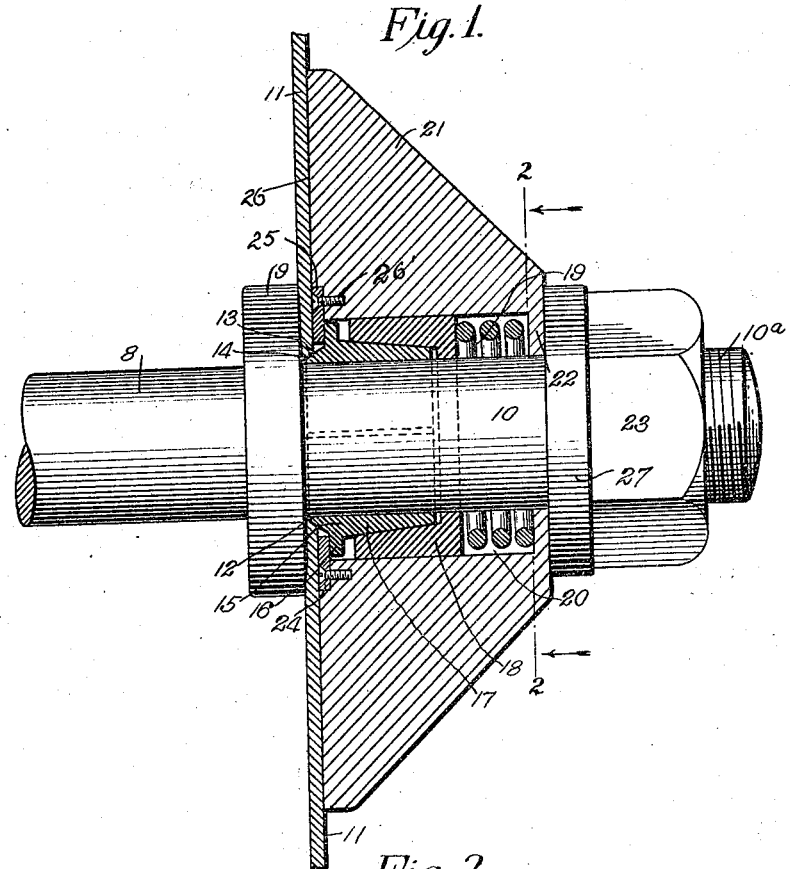
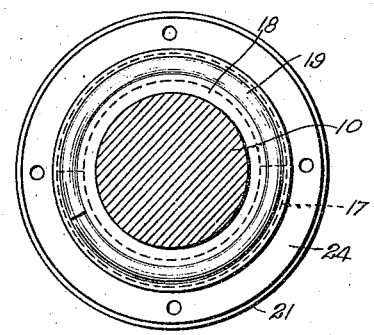
WITNESSES
INVENTORS
Otto Schuler
William Buschmann Jr.
BY
ATTORNEYS

UNITED STATES PATENT OFFICE.

OTTO SCHULER AND WILLIAM BUSCHMANN, JR., OF HALEDON, NEW JERSEY.

DEVICE FOR HANGING CIRCULAR SAWS.

1,286,799.      Specification of Letters Patent.      Patented Dec. 3, 1918.

Application filed August 30, 1918. Serial No. 252,051.

*To all whom it may concern:*

Be it known that we, OTTO SCHULER and WILLIAM BUSCHMANN, Jr., citizens of the United States of America, and residents of Haledon, in the county of Passaic and State of New Jersey, have invented certain new and useful Improvements in Devices for Hanging Circular Saws, of which the following is a specification.

This invention relates to circular saws, and deals particularly with means for automatically centering the saw on its arbor while clamping the saw.

The invention has for its general objects to provide a device of this character which is comparatively simple and inexpensive to manufacture, reliable and efficient in use, and so designed as to automatically adjust itself to the size of the arbor within certain limits, and to automatically center the saw with respect to the arbor by the tightening of the usual clamping nut.

A more specific object of the invention is the provision of a centering device located within the usual clamping collar interposed between the saw and the tightening nut, such centering device including a beveled split ring which enters the arbor hole of the saw, which hole is beveled to correspond to the beveled saw-engaging portion of the ring, and in combination with a ring is a spring-pressed follower which acts on the ring to thrust the same in the arbor hole of the saw.

With such and other objects in view, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in both the views.

Figure 1 is a central section of the device; and

Fig. 2 is a transverse section on the line 2—2, Fig. 1.

Referring to the drawing, 8 represents an arbor for a circular saw, there being formed thereon an annular shoulder or abutment 9 beyond which is a smooth portion 10 that accommodates the means for centering and clamping the saw 11, this means being held by a clamping nut 23 screwed on the threaded extremity $10^a$ of the arbor. The saw 11 has a central opening 12 formed with a bevel 13 with which engages a corresponding conical surface 14 of a split ring or sleeve 15, which latter has a peripheral flange 16 adjacent the bevel 14, and the portion 17 extending outwardly from the flange is tapered into conical form to coöperate with a surrounding follower 18. The follower 18 slides in a chamber 20 in the saw-clamping collar 21, and in this chamber is a spring 19 which bears against the outer wall of the chamber 20 and against the follower, urging the same toward the ring 15, whereby the latter is compressed into tight engagement with the arbor, and at the same time the beveled end 14 thereof enters the opening of the saw and centers the same. The ring 15 is held in place by a retaining washer 24 which is set into a recess 25 in the saw-engaging face 26 of the collar 21 and is fastened in the recess by screws 26'.

The saw is assembled on the end of the arbor and placed against the shoulder 9, and then the collar 21 with the sleeve 15, follower 18 and spring 19 assembled therein, is placed on the arbor, and after the washer 27 is applied the nut 23 is screwed on and tightened, the result being that the split sleeve 15 automatically centers the saw and is itself firmly clamped to the arbor, the centering taking place before the saw is clamped between the shoulder 9 and the collar 21.

From the foregoing description taken in connection with the accompanying drawing, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claims.

Having thus described our invention, we claim as new and desire to secure by Letters Patent:

1. The combination of an arbor having a shoulder, a saw having a beveled arbor opening, a clamping collar having a chamber, a split ring having a beveled portion engaging the opening of the saw to center the same, a follower in the chamber and engaging the sleeve to urge the same toward the saw and to clamp the sleeve on the arbor, spring means in the chamber pressing on the follower, and means on the arbor for holding the collar in clamping relation to the saw, said ring and follower being so shaped that the former wedges in the latter and is contracted thereby.

2. The combination of an arbor, a circular saw having a beveled opening, a split sleeve on the arbor having a beveled extremity engaging the opening to center the saw, said sleeve being tapered in a direction away from the saw, a follower surrounding the tapered portion, means yieldingly urging the follower toward the saw, said arbor having a shoulder, a device engaging the saw to clamp the same against the shoulder, and a nut for holding the device clamped to the saw.

OTTO SCHULER.
WILLIAM BUSCHMANN, Jr.

Copies of this patent may be obtained for five cents each, by addressing the "Commissioner of Patents, Washington, D. C."